United States Defensive Publication [19] (H) [11] T100,204

Weemes et al. [43] Jan. 6, 1981

[54] COATING COMPOSITION

[76] Inventors: Doyle A. Weemes, 1603 Moore Ave., Greeneville, Tenn. 37743; Robert W. Seymour, 1341 Belmeade Dr.; George J. O'Neill, 3805 Thornton Dr., both of Kingsport, Tenn. 37664

[21] Appl. No.: 139,066

[22] Filed: Apr. 10, 1980

Related U.S. Application Data

[63] Continuation of Ser. No. 914,714, Jun. 12, 1978, abandoned.

[51] Int. Cl.[3] ..... C08G 63/18

[52] U.S. Cl. ..... 264/177 R; 428/458; 428/481; 528/304; 528/307; 528/308; 528/309

[57] ABSTRACT

Disclosed is a primer coating composition for use between thermoplastic materials and metal. The primer composition comprises a polyester, at least half of the dibasic acid components of which are selected from terephthalic acid, isophthalic acid, 1,4-cyclohexanedicarboxylic acid or a mixture thereof. The polyester is either amorphous, or may contain some crystallinity to result in a melting point below about 175° C. The heat of fusion of the polyester is less than about 10 calories per gram. The primer is especially useful in promoting adhesion between metal foil and cellulose acetate butyrate laminated thereto.

11 Claims, No Sheets Drawing,

12 Pages Specification

The file of this unexamined application may be inspected and copies thereof may be purchased (849 O.G. 1221, Apr. 9, 1968).